Dec. 6, 1932.  G. J. MURDOCK  1,890,404
POSITION INDICATOR FOR MICROMETER CALIPERS AND GAUGES
Filed Nov. 20, 1928
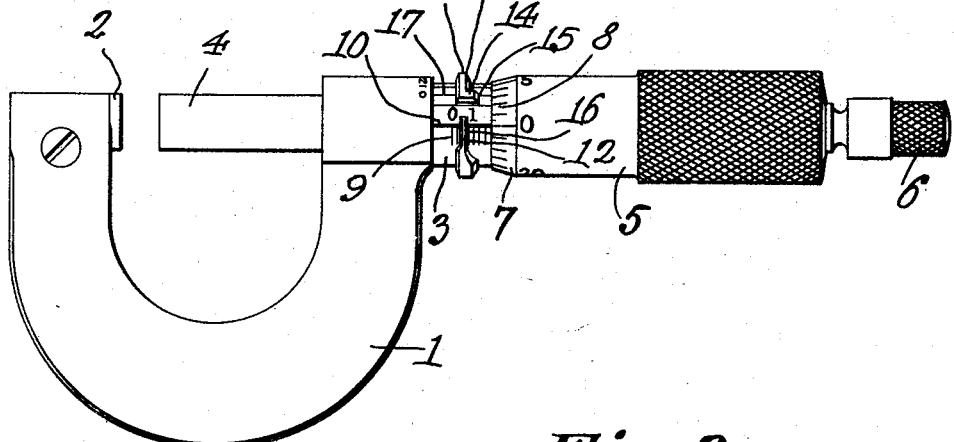
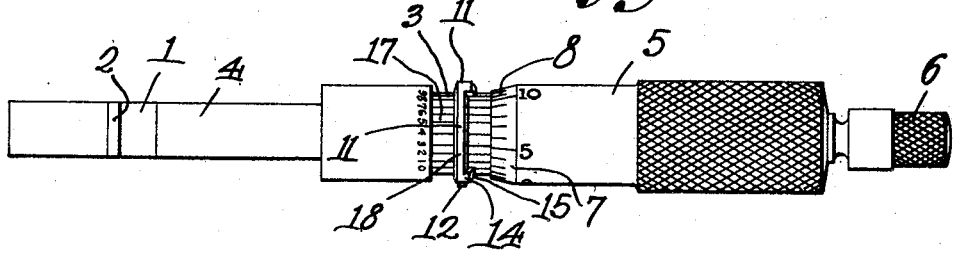
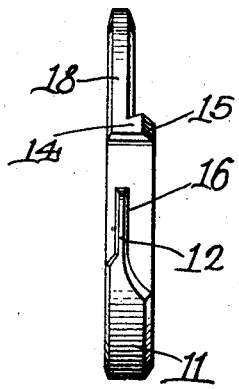 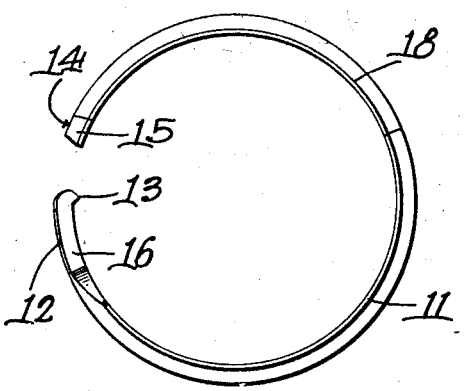 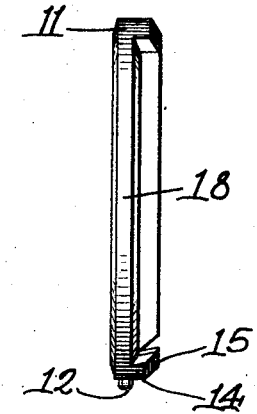
G. J. Murdock, Inventor
By C. A. Snow & Co.
Attorneys.

Patented Dec. 6, 1932

1,890,404

UNITED STATES PATENT OFFICE

GEORGE J. MURDOCK, OF NEWARK, NEW JERSEY

POSITION INDICATOR FOR MICROMETER CALIPERS AND GAUGES

Application filed November 20, 1928. Serial No. 320,615.

This invention relates to a position indicator for use on micrometer calipers, depth gauges and the like, the primary object of the device being to save time, especially in roughing out work, and to provide a safeguard against errors which often occur when the mechanic relies solely upon reading the graduations.

A further object is to provide an indicator which is particularly useful where large numbers of articles of the same size are to be inspected, the construction of the device being such that, after it has once been set, it cannot easily be shifted out of proper position during successive inspections.

A further object is to provide a simple form of position indicator which can be applied readily to micrometer calipers already in use, the said indicator being so shaped as to facilitate reading of the graduations without obscuring any of them to an objectionable extent.

A still further object is to provide a position indicator which, when not in use, is located where it is out of the way.

With the foregoing and other objects in view which will appear as the description proceeds the invention resides in the combination and arrangement of parts and in the details of construction hereinafter described and claimed it being understood that changes in the precise embodiment of the invention herein disclosed may be made within the scope of what is claimed without departing from the spirit of the invention.

In the accompanying drawing the preferred form of the invention has been shown.

In said drawing,

Figure 1 is a side elevation of a micrometer caliper showing the position indicator thereon set for a reading of one hundred seventy-five thousandths of an inch.

Figure 2 is a plan view of the structure shown in Figure 1.
Figure 3 is an enlarged side elevation of the position indicator.

Figure 4 is a face view thereof.

Figure 5 is a top plan view.

Referring to the figures by characters of reference, 1 designates the yoke or frame of a micrometer caliper of standard construction, this frame being provided at one end with an anvil 2 while extending from its other end is the usual hub 3 in which is mounted the spindle 4. The sleeve or thimble 5 is mounted on the hub and carries the usual ratchet stop 6. The operation of a micrometer caliper such as shown and described is well known to those skilled in the art. That end of the sleeve or thimble 5 nearest the frame 1 is tapered to an edge as shown at 7 and provided with an annular series of graduations indicated generally at 8 for designating thousandths of an inch. These graduations can be designated by an annular series of indicating numerals ranging from "0" to "20" so that one complete rotation of the sleeve or thimble from "0" to "0" will measure twenty-five one thousandths of an inch. This complete rotation of the sleeve on the hub will move the edge of the sleeve from one to another of a longitudinal series of graduations 9 formed on the hub 3, the distance between every two adjoining graduations 9 being adapted to measure twenty-five one thousandths of an inch. The first of the graduations 9 can be indicated by the character "0" while every fourth graduation can be designated by numerals indicating from one hundred to ten hundred one thousandths of an inch. A groove 10 is extended longitudinally within the hub 3 along the line of the graduations 9.

The position indicator constituting the present invention is in the form of a split ring of steel or other suitable strong resilient material and has been illustrated on an enlarged scale in Figures 3, 4, and 5. This indicator ring 11 is of a width equal to one hundred one-thousandths of an inch and is reduced in width at one end to provide a tongue 12 having an inwardly extended knife edge or projection 13 at its terminal extending into and adapted to slide along the groove 10. Thus the ring when applied to the hub 3, will be held against rotation thereon although free to slide longitudinally of the hub when moved forcibly by hand. It will grip the hub 3 with such firmness that it cannot be shifted by the sleeve 5 when actuated by the ratchet stop 6. Instead, when the sleeve comes against the ring the ratchet stop will rotate freely without feeding the sleeve. The use of a ratchet stop is common in the micrometer gauge art.

The other end of the ring has a head 14 extending the full width of the ring or one hundred one-thousandths of an inch. The side edges of this head are beveled so as to converge away from the hub, one of these beveled edges, 15, constituting a stop for engagement with the graduated edge of the sleeve 5. The tongue 12 is twenty-five one-thousandths of an inch in width so that it evenly covers the distance from one graduation 9 to the next adjoining one. The edges of the tongue 12 are beveled and that edge 16 nearest the sleeve 5 is set back fifty one-thousandths of an inch from the edge 15 so as thus to give a clear space between the graduated edge of the thimble or sleeve 5 and the tongue 12 when the thimble is in engagement with the indicator.

It might be stated that the extreme width of the position indicator is such that, when it is in position against the adjacent end of the frame 1, it will not prevent the graduated edge of the sleeve or thimble 5 from being brought to the "0" graduation on the hub 3. In other words it does not interfere with the complete closing of the micrometer caliper.

The head 14 is of such length when measured circumferentially of the hub 3 as to rest between the tenths graduations provided on the hub 3 so as not to obscure either of them. As a matter of fact that edge of the head 14 nearest the tongue 12 is set back approximately two one-thousandths of an inch from the line 10.

It will be noted by referring to Figures 2, 4, and 5, that the portion of the position indicator extending over the graduations 17 is reduced in width as shown at 18 thereby to be spaced from the graduated edge of the sleeve or thimble 5 to facilitate accurate reading.

In using this device the same can be applied to the hub 3 of a standard micrometer caliper by unscrewing the sleeve or thimble 5, slipping the position indicator on to the hub, and then replacing said sleeve or thimble. When the position indicator is arranged against the end of the frame 1 it will not interfere with the complete closing of the micrometer caliper because the extreme or maximum width of the position indicator is less than the distance between the frame 1 and the "0" graduation on the hub 3.

Assuming that it is desired to grind down a hard steel rod from one hundred seventy-five one-thousandths of an inch in diameter to one hundred twenty-five one-thousandths of an inch in diameter, the caliper is placed in the palm of the hand after it has been opened a sufficient distance to receive the work and, by means of the thumb and second finger, the position indicator can be moved along the hub 3 until the edge of the tongue 12 is brought to a point fifty one-thousandths of an inch below the one hundred twenty-five thousandth graduation to which the work is to be produced. As the reading edge of the head 14 is fifty one-thousandths of an inch beyond the reading edge of the tongue 12, this setting of tongue 12 will insure the proper setting of the edge of head 14 so that when the graduated edge of the sleeve or thimble 5 comes against the head 14 the correct measurement of one hundred twenty-five thousandths will be made between the anvil 2 and the spindle 4. After the position indicator has thus been accurately arranged on the hub 3 the micrometer caliper can be set against the work by rotating the ratchet stop 6 and by looking at the relative positions of the head 14 and the graduated edge of the sleeve or thimble 5, the workman or other person can readily determine whether or not the work has been reduced to anywhere near the ultimate diameter. Thus very rapid measurements can be taken and this is particularly advantageous in roughing out the work. During the final grinding or cutting of the work the sleeve or thimble 5 can be adjusted against the stop 14 and while it might accidentally be rotated backwardly away therefrom, any readjustment of the thimble or sleeve against the stop by means of the ratchet stop 6 will cause the spindle 4 to come to a stop at the proper point during movement toward the anvil 2 by rotation of the ratchet stop 6. In other words even though the micrometer caliper should be moved accidentally away from set position it could always be returned accurately to proper position by rotating the ratchet stop 6 until the sleeve or thimble 5 comes against the head 14.

Under some conditions the position indicator can be placed at a point twenty-five or fifty one-thousandths above the ultimate dimension to be obtained. In other words instead of placing it initially at the one hundred twenty-five thousandth graduation, where the work is to be reduced to one hundred twenty-five one-thousandths of an inch, the position indicator can be placed at the one hundred seventy-five thousandth graduation and the work roughed out to this diameter. Thereafter the position indicator can be set accurately to the one hundred twenty-five one-thousandth graduation and the work cut down accurately to that dimension.

While the position indicator has been shown and described for use in connection with a micrometer caliper it is to be understood that it can also be used with micrometer depth gauges and similar devices.

What is claimed is:

1. The combination with a micrometer caliper or the like having a hub provided with a longitudinal series of graduations, of a split ring embracing and frictionally engaging the hub, a graduated thimble having a screw feed and adapted, when rotated by hand, to move longitudinally along the hub and thrust against the ring to adjust the ring, and a hand operated ratchet stop for feeding the thimble, said ring gripping the hub with sufficient pressure to constitute a stop for the thimble when actuated by the ratchet stop.

2. The combination with a micrometer caliper or the like having a hub provided with a longitudinal series of graduations, of a split ring embracing and frictionally engaging the hub, cooperating means on the hub and ring for holding the ring against rotation without interfering with the sliding of the ring, a graduated thimble having a screw feed and adapted, when rotated by hand, to move longitudinally along the hub and thrust against the ring to adjust the ring, and a hand operated ratchet stop for feeding the thimble, said ring gripping the hub w'th sufficient pressure to constitute a stop for the thimble when actuated by the ratchet stop.

3. The combination with a micrometer caliper or the like having a hub provided with a longitudinal series of graduations, a thimble rotatable on the hub to feed the thimble longitudinally of the hub, said thimble having an annular series of graduations, and a ratchet stop for actuating the thimble, of means constantly gripping the hub but adjustable along the hub by the pressure of the thimble thereagainst when operated independently of the ratchet stop, said means l'miting the rotation of the sleeve or thimble when actuated by the ratchet stop, and interfitting cooperating means upon the hub gripping means and the hub for holding the said hub gripping means against rotation on the hub.

4. The combination with the hub of a micrometer caliper or the like, said hub having a longitudinal series of graduations, a thimble mounted for rotation on the hub and having an annular series of graduations extending to one edge, and a ratchet stop for rotating the thimble, of a position indicator including a resilient split ring gripping the hub and adjustable longitudinally thereof by the rotation of the thimble independently of the ratchet stop and against the ring, a tongue at one end of the ring, a head at the other end of the ring, one edge of the head constituting a means for engagement by the said edge of the thimble when actuated by the ratchet stop thereby to constitute a stop for the thimble, that edge of the tongue nearest the thimble being set back from the line of the corresponding edge of the head.

5. The combination with the hub of a micrometer caliper or the like, said hub having a longitudinal series of graduations, a thimble mounted for a rotation on the hub and having an annular series of graduations extending to one edge, and a ratchet stop for actuating the thimble, of a position indicator including a resilient split ring gripping said hub and adjustable longitudinally of the hub by the rotation of the thimble thereagainst independently of the ratchet stop, a tongue at one end of the ring, a head at the other end of the ring, one edge of the head constituting a means for engagement by the said edge of the thimble when operated by the ratchet stop to constitute a stop for the thimble, that edge of the tongue nearest the thimble being set back from the line of the top edge of the head a distance equal to a predetermined number of graduations on the hub, said tongue being of a width equal to the distance between two adjoining graduations, thereby to leave all graduations exposed when the position indicator is set.

6. The combination with the hub of a micrometer caliper or the like, said hub having a longitudinal series of graduations, a thimble mounted for rotation on the hub and having an annular series of graduations extending to one edge, and a ratchet stop for rotating the thimble, of a position indicator including a resilient split ring gripping the hub and adjustable longitudinally of the hub by the rotation of the th:mble thereagainst independently of the ratchet stop, a tongue at one end of the ring, a head at the other end of the ring, one edge of the head constituting a means for engagement by the said edge of the thimble to constitute a stop for the thimble when the thimble is operated by the ratchet stop, there being a longitudinal groove in the hub, and means on the tongue for sliding engagement with the groove to hold the position indicator against rotation.

7. The combination with the hub of a micrometer caliper or the like, said hub having a longitudinal series of graduations, and a thimble mounted for rotation on the hub having an annular series of graduations extending to one edge, of a position indicator including a resilient split ring gripping the hub and adjustable longitudinally thereof by the rotation of the thimble against the ring but affording limited resistance to the movement of the thimble, a tongue at one end of the ring, a head at the other end of the ring, one edge of the head constituting a means for engagement by the said edge of the thimble, that edge of the tongue nearest the thimble being set back from the line of the corresponding edge of the head.

8. The combination with the hub of a micrometer caliper or the like, said hub having a longitudinal series of graduations, and a thimble mounted for rotation on the hub having an annular series of graduations extending to one edge, of a position indicator including a resilient split ring gripping and adjustable longitudinally of the hub by the rotation of the thimble thereagainst, said ring affording limited resistance to the movement of the thimble, a tongue at one end of the ring, a head at the other end of the ring, one edge of the head constituting a means for engagement by the said edge of the thimble, that edge of the tongue nearest the thimble being set back from the line of the top edge of the head a distance equal to a predetermined number of graduations on the hub, said tongue being of a width equal to the distance between two adjoining graduations, thereby to leave all graduations exposed when the position indicator is set.

9. The combination with the hub of a micrometer caliper or the like, said hub having a longitudinal series of graduations, and a thimble mounted for rotation on the hub having an annular series of graduations extending to one edge, of a position indicator including a resilient split ring gripping the hub and adjustable longitudinally of the hub by the rotation of the thimble thereagainst, said ring affording a limited resistance to the movement of the thimble, a tongue at one end of the ring, a head at the other end of the ring, one edge of the head constituting a means for engagement by the said edge of the thimble, there being a longitudinal groove in the hub, and means on the tongue for sliding engagement with the groove to hold the position indicator against rotation.

In testimony that I claim the foregoing as my own, I have hereto affixed my signature.

GEORGE J. MURDOCK.